United States Patent
Heneghan et al.

[11] Patent Number: 5,699,581
[45] Date of Patent: Dec. 23, 1997

[54] HEATED WIPER ASSEMBLY WITH BRUSH ATTACHMENT

[76] Inventors: Ken Heneghan; Karen Heneghan, both of 18 W. Belle Plaine, Park Ridge, Ill. 60068

[21] Appl. No.: 661,696

[22] Filed: Jun. 11, 1996

[51] Int. Cl.⁶ .................. B60S 1/48; B60S 1/38; B60S 1/28
[52] U.S. Cl. ............... 15/250.07; 15/250.01; 15/250.41; 15/250.4; 219/203
[58] Field of Search ............ 15/250.01, 250.02, 15/250.03, 250.04, 250.05, 250.07, 250.08, 250.09, 250.06, 250.4, 250.41, 250.48; 219/202, 203

[56] References Cited

U.S. PATENT DOCUMENTS

| | | | |
|---|---|---|---|
| 1,894,861 | 1/1933 | Gallagher, Jr. | 15/250.07 |
| 2,273,817 | 2/1942 | Chellew | 15/250.41 |
| 2,654,016 | 9/1953 | Martin | 15/250.07 |
| 3,034,166 | 3/1962 | Bell | 15/250.07 |
| 3,936,901 | 2/1976 | Theckston | 15/250.04 |
| 3,939,524 | 2/1976 | Knights | 15/250.04 |
| 4,090,668 | 5/1978 | Kochenour | 15/250.05 |
| 4,339,839 | 7/1982 | Knights | 15/250.41 |
| 4,700,424 | 10/1987 | Hagen | 15/250.07 |
| 4,719,661 | 1/1988 | Hanselmann | 15/250.4 |
| 4,852,204 | 8/1989 | Wilson | 15/250.05 |
| 4,967,437 | 11/1990 | Morse | 15/250.07 |

FOREIGN PATENT DOCUMENTS 8001155  6/1980  WIPO ............... 15/250.4

*Primary Examiner*—Gary K. Graham
*Attorney, Agent, or Firm*—Patent & Trademark Services; Joseph H. McGlynn; Thomas Zack

[57] ABSTRACT

A heated windshield wiper with a detachable brush assembly. An enclosed metal housing contains the heating element supplied with electrical energy from the engine's battery to heat the attached wiper. The brush is slidably mounted within an external housing channel and retained therein by two spring tab members extending through openings in the housing. Fluid from the automobile's windshield washer reservoir may be supplied heat from a second heating element before sprayed on the windshield.

2 Claims, 1 Drawing Sheet

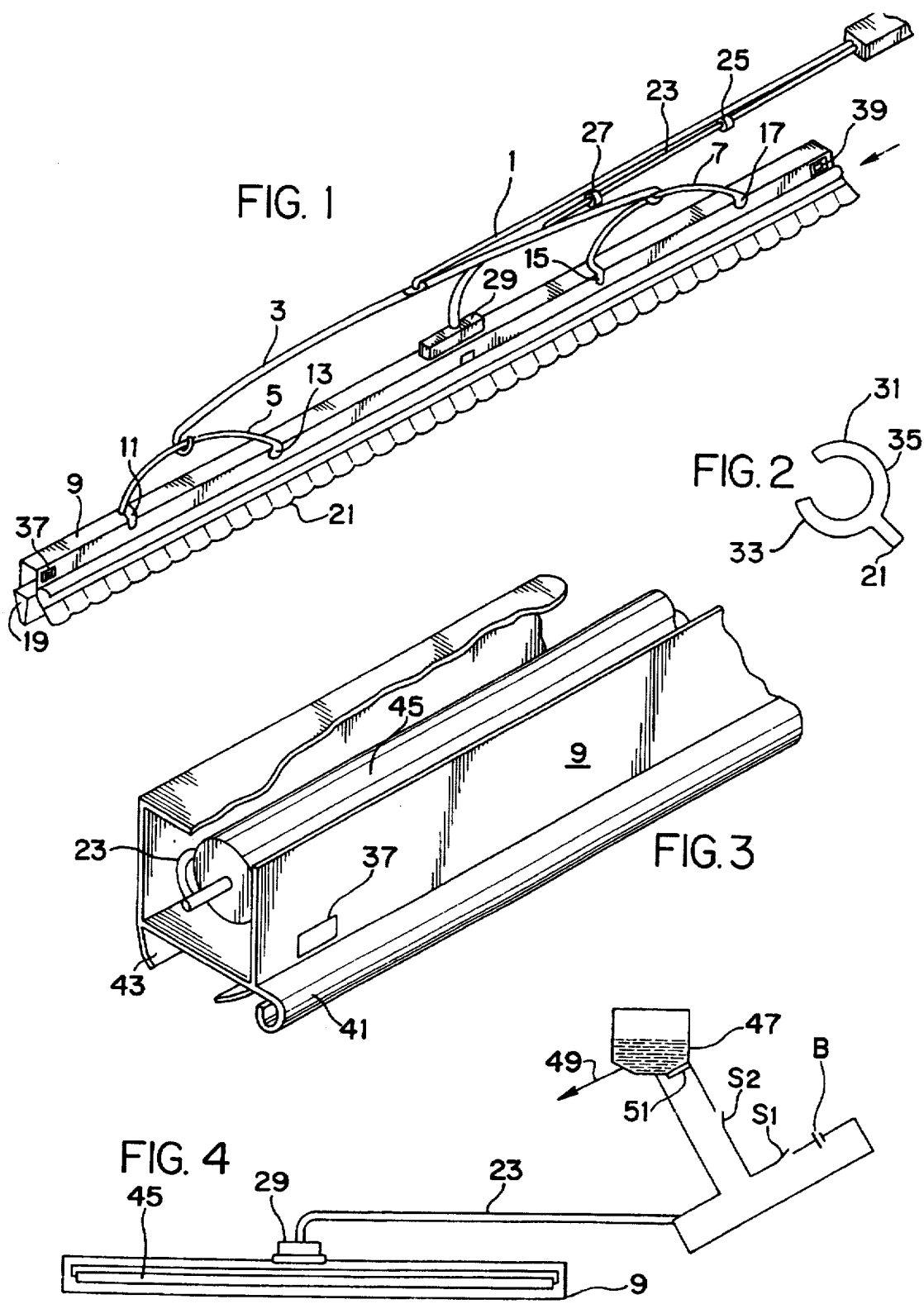

HEATED WIPER ASSEMBLY WITH BRUSH ATTACHMENT

BACKGROUND OF THE INVENTION

The present invention relates to an automobile heated windshield wiper. An electrically operated heating element warms the windshield as its wiper moves back and forth. Electric power is supplied by a wire to the wiper which may also have a detachable brush assemblies to assist in the removal of ice and snow. Additionally, the windshield washer fluid can be coil heated before it is sprayed to prevent icing.

DESCRIPTION OF THE PRIOR ART

In the prior art various types of heated wire and brush assemblies have been attached to windshield wiper blades. The Bell reference (U.S. Pat. No. 3,034,166) shows an assembly with a U-shaped heated wire held by spaced clips to a wiper. In the Knights patent (U.S. Pat. No. 3,939,524) a flexible brush assembly is attached to a wiper. A spring mounted wiper with the spring connected to the car's electric system is disclosed in U.S. Pat. No. 4,852,204 to Wilson. And in U.S. Pat. No. 4,967,437 to Morse a plastic blade holder has a groove which supports the electric heating element. None, however, use a heated wiper with its removal brush assembly as disclosed and claimed herein.

SUMMARY OF THE INVENTION

The present invention consists of an electrically heated windshield wiper with a detachable brush. Window washer fluid supplied to the windshield is heated before it is sprayed.

It is an object of the present invention to provide an improved heated windshield wiper.

It is a further object of the present invention to provide such a wiper having a detachable brush assembly.

It is another object of the present invention to also provide a heated windshield wiper with a detachable brush having heated windshield wiper fluid.

These and other objects and advantages of the present invention will be fully apparent from the following description, when taken in connection with the annexed drawings.

BRIEF DESCRIPTION OF THE DRAWINGS

FIG. 1 is a perspective view of the preferred embodiment of the present invention.

FIG. 2 is a side view of the brush mounting frame.

FIG. 3 is an enlarged sectional view showing part of the housing chassis and its major components.

FIG. 4 is a top view showing schematically the electrical hook up to the wiper.

DESCRIPTION OF THE PREFERRED EMBODIMENT

Referring now to the drawings in greater detail, FIG. 1 shows a wiper arm 1 with its conventional spring metal frame 3. At each of the two frame ends, arcuate shaped joining members 5 and 7 are pivotally mounted. The two other ends of these joining members are held to the elongated tubular metal housing chassis 9 the four opened clips 11, 13, 15 and 17, as shown. Parallel and below to the chassis 9 in contact with the windshield is the a conventional elongated rubber wiper blade (not shown). A detachable brush 21 substantially the same length as the wiper also engages the vehicle's windshield and is detachably mounted in the chassis member 9.

Extending lengthwise along the arm 1 is a weather proof flexible electric wire 23 held thereto by the clamp retainers 25 and 27. The wire terminates at its wiper end at the electrical connector 29 located on the top of the chassis 9. Also shown are two spaced spring tab members 31 and 33 which permit tensioning of the brush attachment 21. At the upper end of the brush (see FIG. 2) is a C shaped frame brush mounting member 35 used to attach the brush to the chassis. The opened end of this C member extends long the brush length and is mounted to the chassis by sliding it into a complementary shaped channel. The C member has two spaced spring tabs which fit into two spaced openings 37 and 39 in the chassis 9. When positioned correctly, the tabs extend through these opening to lock the brush in the chassis. By depressing the channel mounted tabs and sliding the brush in the direction of the arrow as shown in FIG. 1, the brush may be removed from its mount.

FIG. 3 is an enlarged sectional view showing the chassis housing 9 and its major components. In this view the brush is not attached. Forming part of the chassis housing is the extending front channel 41 which acts to slidably receive the brush's upper C member 35. One tab receiving opening 37 is shown which acts to receive the brush's spring tab from which it would extend through. Also shown in this figure is the female connector 43 for the rubber wiper blade 19, chassis mounted rod type heating element 45 and its wire 23 electrically connected to the electrical connector 29. The heating element can become very warm using electric power supplied from a vehicle's battery and hot enough to melt ice, but not the rubber component of the wiper blade (melting point approximately 105 to 120 degrees F.). This heating element is an "off the shelf item."The chassis housing is normally closed on all sides to the environment except for the two tab openings 37 and 39.

FIG. 4 is a top view showing schematically the electrical hook up to the wiper. Direct current power from a 12 volt automobile battery is transmitted via wire 23 to the chassis connector 29 and heating element 45. Heat supplied is provided to the chassis and its attached wiper and brush to melt any ice or snow. An appropriate conventional switch S1 located inside the vehicle's passenger compartment on its dash panel can be wired between the battery B and the wiper's connector to disable the supply of electrical power to the heating element 45. A conventional windshield wiper fluid reservoir 47 located in the engine compartment may be hard wired into the circuit and provide with a second heating element 51 to heat washer fluid supplied via line 49 to the windshield. If desired, a second switch S2 can be located inside the vehicle's passenger compartment on its dash panel can be used to disable power to the washer fluid heating element if desired.

When in use with its brush attached the wiper is first heated allowing a user to free the frozen windshield wipers and clear ice, sleet and freezing rain. When the wipers is tamed on to oscillate back and forth, the brush proceeds first in clearing the windshield followed by the attached heated wiper. Should weather conditions improve either the heat element 45 may be switched off or the brush detached from its channel mount.

The metal chassis housing 9 can be manufactured using the metal stamping process. Metal stamping is a process whereby flat metal is formed between two parts of a die under tremendous pressure. The metal is punched, formed and shaped to these dies, many times in one process, many times spot welding of separate components is employed to complete the assembly of sheet metal components. The stamped metal may be stainless steel or plated carbon steel to prevent rusting.

The rubber wiper blades can be manufactured by using the plastic extrusion process. The plastic extrusion process is one whereby molten, heat softened plastic is forced under high pressure through a die, similar to toothpaste being squeezed through the hole in the tube,(in this example the hole in the tube is the die). The plastic forms a continuous length in the shape of the die it was squeezed through. In other words the plastic would come out continually in the shape of a rod using the nozzle of the toothpaste tube as a die, but would come out in the shape of a square if the die were square. In this case the plastic extrusion would take on the shape of the wiper blade. Many familiar parts you deal with on a weekly basis were more than likely extruded. Plastic molding, door thresholds, plastic straws and similar items are all manufactured using the extrusion process.

Several different types of plastic and rubber are used in the extrusion process including, but not limited to, nylon, ABS plastic, styrene, polyethylene to name a few common ones. If a plastic part is to be used where the outside elements will affect it, a special additive or coating may be added to the plastic to prevent ultraviolet light from decaying it. All plastics are derived from organic materials and can be affected adversely by ultraviolet light.

Although the Warm Wipe and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What we claim as our invention is:

1. An electrically heated windshield wiper assembly for use with automobiles, said assembly comprising:

an elongated tubular housing chassis extending in a first direction, said chassis defining a top and a bottom, said chassis having a slot defined on said bottom, an external channel member extending along and coupled with a lower edge of said bottom and a plurality of side chassis openings extending therethrough;

an elongated wiper blade received in said slot;

an elongated detachable brush assembly mounted on said external channel member, said brush assembly including a brush and an elongated brush mounting member detachably engaging said channel member, said mounting member having a plurality of spring tab members which engage in respective chassis openings; and an electrical heating element mounted within and to said chassis, said heating element adapted to be connected to a power supply to supply heat to the chassis.

2. The assembly of claim 1, wherein said brush mounting member is C-shaped in transverse cross section.

* * * * *